US009760247B2

(12) United States Patent
Watanabe et al.

(10) Patent No.: US 9,760,247 B2
(45) Date of Patent: Sep. 12, 2017

(54) OPERATION DISPLAY DEVICE OF CHASSIS DYNAMOMETER SYSTEM

(75) Inventors: Kenji Watanabe, Ota (JP); Yukimasa Maneki, Ota (JP)

(73) Assignee: MEIDENSHA CORPORATION, Tokyo (JP)

( * ) Notice: Subject to any disclaimer, the term of this patent is extended or adjusted under 35 U.S.C. 154(b) by 243 days.

(21) Appl. No.: 14/002,196

(22) PCT Filed: Mar. 2, 2012

(86) PCT No.: PCT/JP2012/055452
§ 371 (c)(1),
(2), (4) Date: Aug. 29, 2013

(87) PCT Pub. No.: WO2012/121169
PCT Pub. Date: Sep. 13, 2012

(65) Prior Publication Data
US 2013/0339892 A1   Dec. 19, 2013

(30) Foreign Application Priority Data

Mar. 4, 2011   (JP) .................. 2011-047120

(51) Int. Cl.
*G06F 3/048*   (2013.01)
*G06F 3/0482*   (2013.01)
(Continued)

(52) U.S. Cl.
CPC .............. *G06F 3/0482* (2013.01); *G01L 3/24* (2013.01); *G01M 15/044* (2013.01); *G01M 17/0072* (2013.01); *G06F 3/0481* (2013.01)

(58) Field of Classification Search
CPC .................. G06F 8/34; G05B 19/0426; G05B 2219/23258; G01L 3/24; G01L 1/2243;
(Continued)

(56) References Cited

U.S. PATENT DOCUMENTS 4,870,585 A * 9/1989 Manzolini ........... G01M 15/044
701/101
5,521,824 A * 5/1996 Eagan .................. G01M 15/044
700/282
(Continued)

FOREIGN PATENT DOCUMENTS

JP   02-021234 A   1/1990
JP   05-087554 U   11/1993
(Continued)

OTHER PUBLICATIONS

Watanabe, K. et al., USPTO Non-final Office Action U.S. Appl. No. 14/002,562 dated Oct. 24, 2014, 8 pgs.
(Continued)

*Primary Examiner* — Joy Weber
(74) *Attorney, Agent, or Firm* — Foley & Lardner LLP

(57) ABSTRACT

There is a demand for enhancement of operability when a change of combination of rollers of a chassis dynamometer and the dynamometer is set depending upon a vehicle type of a test vehicle. A status indicating function block that indicates an equipment construction is disposed in a main menu display area that is provided on a console. With this arrangement, a current test status can be recognized. Further, a vehicle type selection window calling function block is disposed in a mode setting function button group in the main menu display area. A vehicle type selection window called by the vehicle type selection window calling function block includes a roller selection section to select rollers corresponding to the test vehicle, a setting display section that indicates a current setting equipment construction, and a setting display section that indicates a setting equipment construction during change of the setting.

3 Claims, 5 Drawing Sheets

Diagram of the window in the course of change of a vehicle drive system

(51) Int. Cl.
*G06F 3/0481* (2013.01)
*G01L 3/24* (2006.01)
*G01M 15/04* (2006.01)
*G01M 17/007* (2006.01)

(58) Field of Classification Search
CPC .......... G01L 5/161; G01L 3/00; G01M 99/00; G01M 17/0072; A01B 69/008
USPC ......... 715/771, 764; 73/862; 701/29.1, 29.4, 701/31.4
See application file for complete search history.

(56) References Cited

U.S. PATENT DOCUMENTS

| | | | |
|---|---|---|---|
| 5,531,107 | A | 7/1996 | Ganzhorn, Jr. |
| 5,542,290 | A | 8/1996 | Suzuki |
| 6,457,351 | B1 * | 10/2002 | Yamamoto ........ G01M 17/0072 73/116.05 |
| 8,190,318 | B2 | 5/2012 | Li et al. |
| 9,097,613 | B2 * | 8/2015 | Konishi ............ G01M 17/0074 |
| 2002/0018982 | A1 | 2/2002 | Conroy |
| 2007/0088465 | A1 | 4/2007 | Heffington |
| 2007/0118258 | A1 | 5/2007 | Probst et al. |
| 2013/0333486 | A1 | 12/2013 | Watanabe |
| 2013/0338957 | A1 | 12/2013 | Watanabe |

FOREIGN PATENT DOCUMENTS

| | | | | |
|---|---|---|---|---|
| JP | 08-278232 | A | 10/1996 | |
| JP | 10-281940 | A | 10/1998 | |
| JP | 2004-309290 | A | 11/2004 | |
| JP | 2005-010124 | A | 1/2005 | |
| JP | 2005-049353 | A | 2/2005 | |
| JP | 04-039296 | B2 | 11/2007 | |
| JP | 2008-082857 | A | 4/2008 | |
| JP | 2008-224403 | A * | 9/2008 | ............ G01M 17/00 |
| JP | 2008-224403 | A | 9/2008 | |
| JP | 2009-198480 | A * | 3/2009 | .......... G01M 17/007 |
| JP | 2009-198480 | A | 9/2009 | |
| JP | 2011-027478 | A | 2/2011 | |

OTHER PUBLICATIONS

Watanabe, K. et al., USPTO Notice of Allowance U.S. Appl. No. 14/002,562 dated Feb. 20, 2015, 8 pgs.
K. Watanabe et al, "Dynamometer System Tokushu Shin Gijutsu Shin Seihin Seigyo Keisoku System MEIDACS-DY6000P", Meiden Jiho, No. 4, Jul. 31, 2003, pp. 26-30.
International Search Report and Japanese Language Written Opinion from PCT/JP2012/055453, dated May 22, 2012, 1 page.
International Search Report and Japanese Language Written Opinion from PCT/JP2012/055454, dated May 22, 2012, 2 pages.
Watanabe, K. et al., USPTO Non-Final Office Action U.S. Appl. No. 14/002,537 dated Jan. 4, 2016, 17 pgs.
USPTO Office Action, U.S. Appl. No. 14/002,537 dated Oct. 6, 2016, 15 pages.
USPTO Office Action, U.S. Appl. No. 14/002,537 (2002/0018982, 2007/0088465, 2007/0118258, U.S. Pat. No. 5,531,107, U.S. Pat. No. 5,542,290, U.S. Pat. No. 8,190,318), dated Apr. 24, 2017.

* cited by examiner

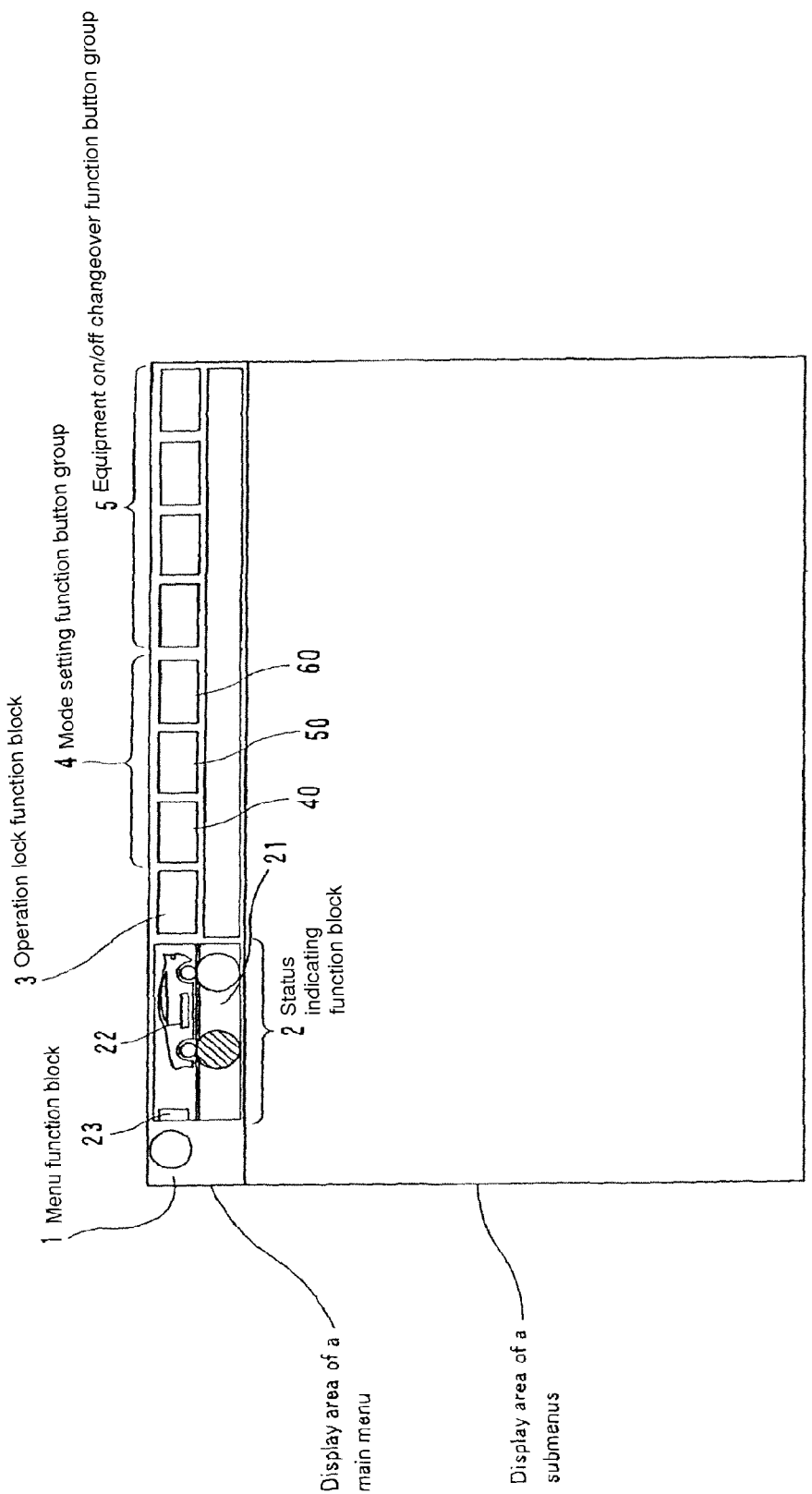

FIG. 2 Diagram of the window which select a vehicle drive system.
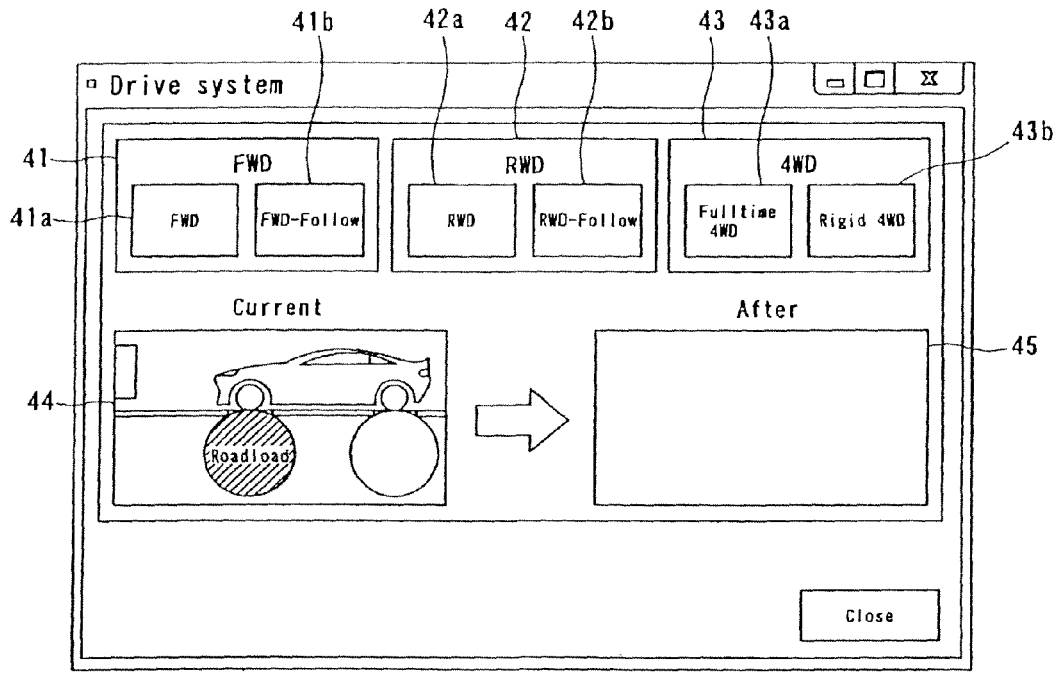
FIG. 3 Diagram of the window in the course of change of a vehicle drive system
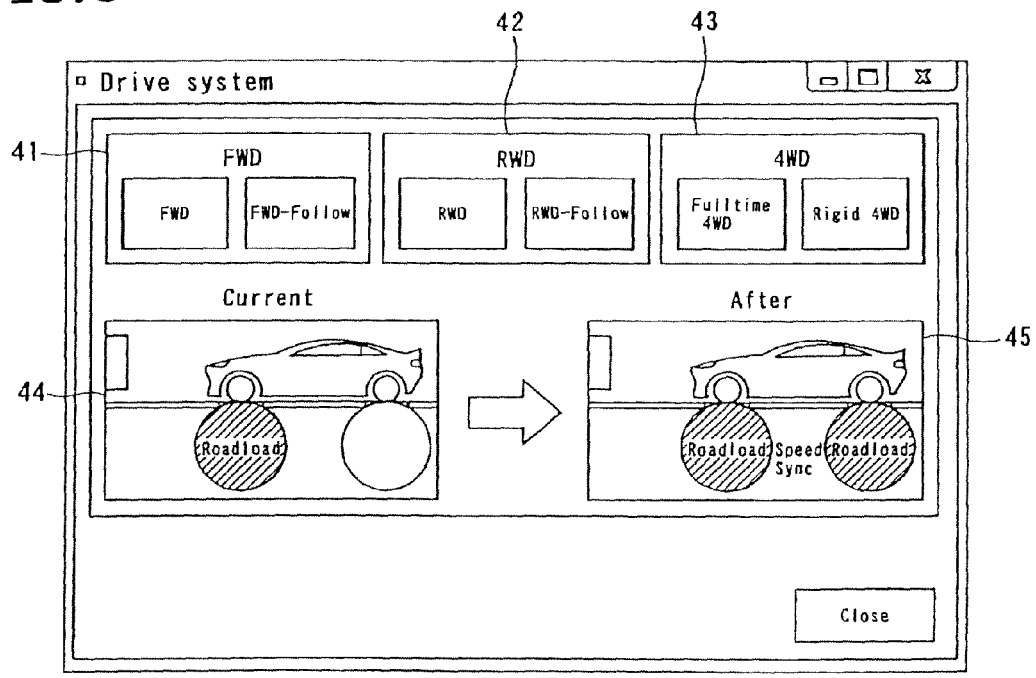

FIG. 4   Diagram of the window after changing a vehicle drive system
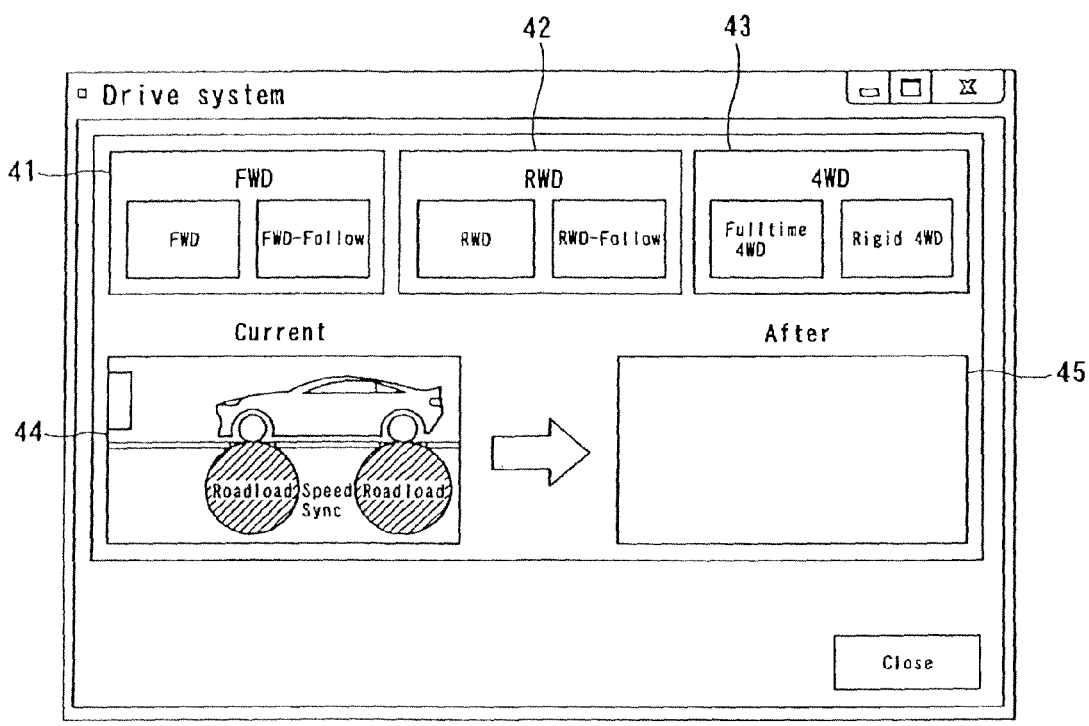

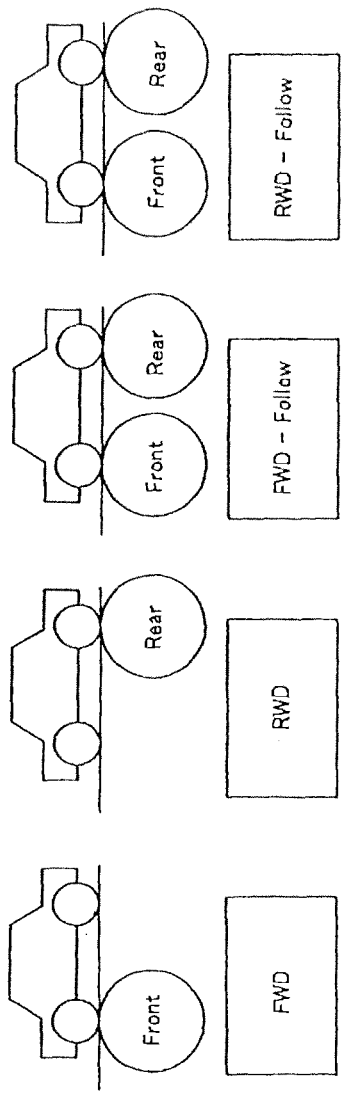
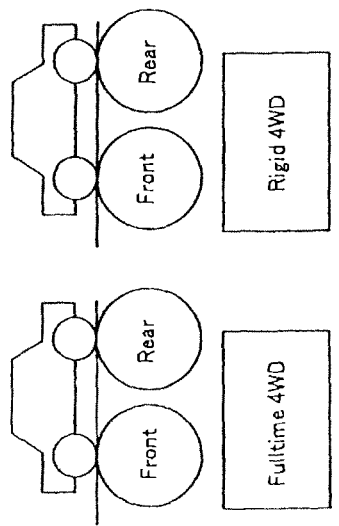
FIG. 6(a) FIG. 6(b) FIG. 6(c) FIG. 6(d) FIG. 6(e) FIG. 6(f)

OPERATION DISPLAY DEVICE OF CHASSIS DYNAMOMETER SYSTEM

TECHNICAL FIELD

The present invention relates to an operation display device of a chassis dynamometer system, and particularly relates to a display device having an operation window based on a vehicle type of a test vehicle, or the like.

BACKGROUND ART

FIG. 5 is a diagram showing a schematic configuration of a chassis dynamometer system. Reference sign Rf denotes a roller for a front wheel of a test vehicle on which the front wheel is set. Reference sign Rr denotes a roller for a rear wheel of the test vehicle on which the rear wheel is loaded. A dynamometer (not shown) as a load is coupled to each of the rollers (Rf, Rr) for the front and rear wheels. Reference signs IV1, IV2 denote inverter boards through which each of the dynamometers is controlled on the basis of a predetermined set value, a speed signal detected by a speed detector Sd and the like. Reference sign PLC denotes a switchgear panel through which on/off control of switchgear for turning on or off a power supply of an auxiliary equipment such as a blower B1 is carried out. Reference sign Op denotes a controller in which a control block and a computation block such as a sequencer, a controller, etc. are accommodated. Setting and operation of the controller are carried out through a control terminal (PC). The controller (Op), the control terminal (PC) and the like serve to constitute a console.

Patent Literature 1: Japanese Patent Application Unexamined Publication No. 2008-224403

SUMMARY OF THE INVENTION

There are several kinds of drive systems for a vehicle to be tested by the chassis dynamometer system shown in FIG. 5. A relationship between the rollers coupled to the dynamometer as a load varies corresponding to the drive systems.

FIG. 6 shows a relationship between vehicle types and the rollers. As shown in FIG. 6(a)-6(f), the vehicle type is classified into front wheel drive, rear wheel drive, front wheel drive-rear wheel follow-up, rear wheel drive-front wheel follow-up, full-time 4WD and rigid 4WD. In the case where the vehicle type is the front wheel drive (FWD), as shown in FIG. 6(a), only the roller on the side of the front wheel as a driving wheel rotates, or as shown in FIG. 6(c), the roller on the side of the front wheel rotates and the roller on the side of the rear wheel follows rotation of the roller on the side of the front wheel.

Similarly, in the case where the vehicle type is the rear wheel drive (RWD), there is the relationship as shown in FIG. 6(b) or the relationship as shown in FIG. 6(d). In the case where the vehicle type is the four-wheel drive 4WD), there is the relationship as shown in FIG. 6(e) or the relationship as shown in FIG. 6(f).

When fuel consumption or exhaust gas is measured using a chassis dynamometer, a chassis dynamometer inherent to each vehicle type can be basically used as a testing device. In such a case, for such a reason that a large number of test facilities are necessary, the test is carried out by varying combination of the rollers of a four-wheel drive vehicle chassis dynamometer which are to be used. On the other hand, upon measuring fuel consumption or exhaust gas, generally, a place (a test cell) in which the rollers of the chassis dynamometer are set and a position in which a console for the test is set are individually provided in separate rooms in consideration of working circumstances such as safety of an operator, noise, etc. Therefore, there occurs a problem that on the side of the console, the operator cannot confirm whether or not an operating status of the rollers to be actually operated is conformed to the vehicle type of the test vehicle. Further, even when the console and the chassis dynamometer are set in the same room, the rollers of the chassis dynamometer are placed within a pit (underground), and tires of the vehicle are occasionally surrounded by a safety fence, so that visual confirmation cannot be readily attained. Accordingly, upon starting the test, it is difficult to confirm whether or not the vehicle type of the test vehicle and the rollers to be used together therewith are conformed to each other, or confirm an operating status of the equipment such as an on/off status of a cooling fan. Meanwhile, in Patent Literature 1, an example of a window indicating results of measurement of a mechanical loss, and examples of other windows are described. However, Patent Literature 1 fails to describe selection of a vehicle type of the test vehicle, determination of rollers to be used in accordance with the vehicle type selected, and a method of displaying the same.

An object of the present invention is to provide an operation display device of a chassis dynamometer system which can display selected information such as determination of rollers to be used in accordance with the vehicle type of a test vehicle, and the like, on a console.

According to one aspect of the present invention, there is provided an operation display device of a chassis dynamometer system, the chassis dynamometer system including a controller that controls rollers through inverters upon testing a test vehicle loaded on the rollers, the operation display device including an operation window in which setting of the controller is carried out, the operation window comprising a status indicating function block that indicates use/non-use of front and rear rollers as a setting status of the chassis dynamometer system.

According to other aspect of the present invention, there is provided the operation display device of a chassis dynamometer system, wherein the status indicating function block includes an indicator section that indicates an on/off status of a cooling fan or a speed indicator section that indicates a vehicle speed of the test vehicle.

According to another aspect of the present invention, there is provided the operation display device of a chassis dynamometer system, wherein the operation window is constituted of a main menu display area and a submenu display area, the main menu display area comprising a window that indicates an operation lock function block, a mode setting function button group and an on/off changeover function button group in addition to the status indicating function block.

According to a still another aspect of the present invention, there is provided the operation display device of a chassis dynamometer system, wherein the mode setting function button group includes a vehicle type selection window calling function block that calls a vehicle type selection window, the vehicle type selection window as called by the vehicle type selection window calling function block including a roller selection section to select the rollers corresponding to the test vehicle, a current setting display section that indicates a setting status of the rollers that are currently used, and a setting changing display section that indicates a setting changing status in which the setting status of the rollers previously used is in the course of change to a setting status of the rollers corresponding to a vehicle type of the test vehicle, the roller selection section, the current setting display section and the setting changing display section being disposed on a same window.

According to a still other aspect of the present invention, there is provided the operation display device of a chassis dynamometer system, wherein the mode setting function button group includes a vehicle type selection window calling function block that calls a vehicle type selection window, the vehicle type selection window as called by the vehicle type selection window calling function block including a front-wheel drive display section, a rear-wheel drive display section and a four-wheel drive display section which indicate a front-wheel drive, a rear-wheel drive and a four-wheel drive as drive systems of the test vehicle, respectively, the front-wheel drive display section including a front-wheel drive roller selection section and a front-wheel drive-and-rear-wheel follow-up roller selection section which are disposed adjacent to each other, the rear-wheel drive display section including a rear-wheel drive roller selection section and a rear-wheel drive-and-front-wheel follow-up roller selection section which are disposed adjacent to each other, and the four-wheel drive display section including a fulltime 4WD roller selection section and a rigid 4WD roller selection section which are disposed adjacent to each other.

BRIEF DESCRIPTION OF DRAWINGS

FIG. 1 is a diagram showing a schematic construction of a main menu display area on an operation display device according to an embodiment of the present invention.

FIG. 2 is a diagram showing a current setting status of a vehicle type selection window calling function block on the operation display device.

FIG. 3 is a diagram showing a status of the vehicle type selection window calling function block in which the setting status is in the course of change.

FIG. 4 is a diagram showing a status of the vehicle type selection window calling function block after completion of the change.

FIG. 6 is an explanatory diagram showing a relationship between a vehicle type of a test vehicle and rollers to be used with the test vehicle.

BEST MODE FOR CARRYING OUT THE INVENTION

Figure 5:
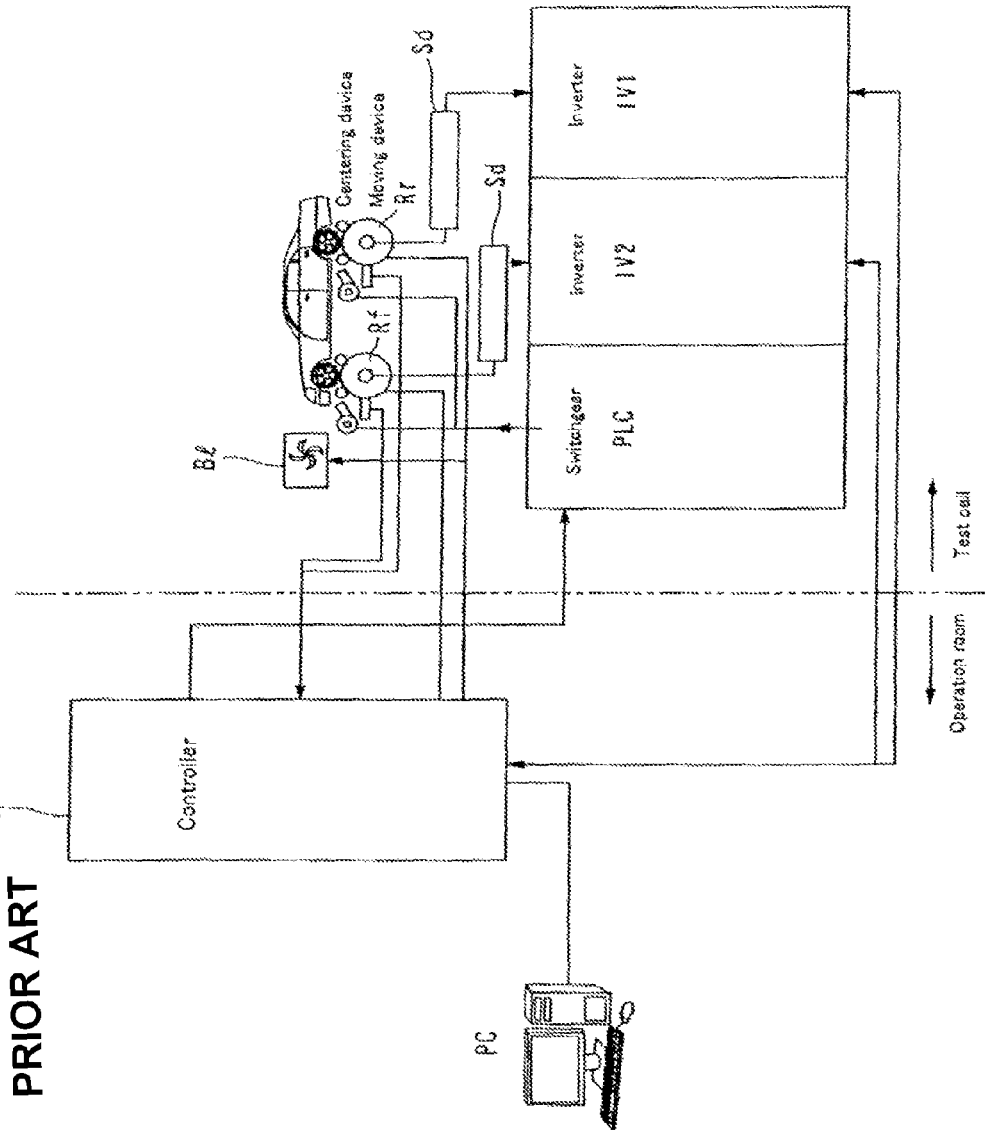
FIG. 5 is a diagram showing a system configuration of a chassis dynamometer.

FIG. 1 shows an example of an operation window in an operation display portion provided on a console as an operation display device according to the present invention. In FIG. 1, a main menu display area in the operation window includes a menu function block 1, a status indicating function block 2 that indicates a status of equipments of a chassis dynamometer, an operation lock function block 3, a mode setting function button group 4 and an equipment on/off changeover function button group 5. These function blocks and function button groups are selected with a mouse-click or a touch-panel operation.

The menu function block 1 includes callers for various items such as vehicle type ID, alarm setting, maintenance setting, warm-up setting and measuring monitor display, although not shown.

The status indicating function block 2 is a block configured to indicate a setting status of the chassis dynamometer as currently set. The status indicating function block 2 includes an indicator section 21 that indicates use/non-use of front and rear rollers, a vehicle speed indicator section 22 and an indicator section 23 that indicates use/non-use of a cooling fan. The operation lock function block 3 serves for changeover of an operation of the mode setting function button group 4 and the on/off changeover function button group 5 between a valid status and an invalid status. In addition, when for instance, a touch panel or the like is used as an input device, an erroneous operation of the touch panel can be prevented by using the operation lock function block 3.

The mode setting function button group 4 is provided with a vehicle type selection window calling function block 40. The vehicle type selection window calling function block 40 serves to call a vehicle type selection window as shown in FIG. 2 to FIG. 4 into a submenu display area. The vehicle type selection screen (FIG. 2 to FIG. 4) displayed in the submenu display area includes three display sections serving for selection of a vehicle type, that is, a front-wheel drive (FWD) display section 41, a rear-wheel drive (RWD) display section 42 and four-wheel drive (4WD) display section 43, respectively. The three display sections 41-43 each include two kinds of selection sections. Specifically, the front-wheel drive (FWD) display section 41 includes a roller selection section 41a to select rollers for only front-wheel drive, and a follow-up roller selection section 41b to select rollers for front-wheel drive and rollers for a rear-wheel follow-up, such that a relationship between a vehicle type and rollers to be used as shown in FIG. 6 is satisfied. Similarly, the rear-wheel drive (RWD) display section 42 includes a roller selection section 42a to select rollers for only rear-wheel drive, and a follow-up roller selection section 42b to select rollers for rear-wheel drive and rollers for a front-wheel follow-up. Further, the 4WD display section 43 includes a fulltime selection section 43a and a rigid selection section 43b.

Further, the vehicle type selection window (FIG. 2 to FIG. 4) includes a current setting display section 44 that serves to visually recognize a setting status of a current vehicle type of the test vehicle and the rollers to be used therewith, and a setting changing display section 45 that serves to visually recognize a setting changing status in the course of changing a setting status. The vehicle type selection window constituted of these display sections 41-45 is displayed on a single window together with the function blocks and the function button groups in the main menu display area. Further, the six selection sections (41a, 41b, 42a, 42b, 43a, 43b) are set to change a contrast thereof when a drive system of the vehicle type is selected. Otherwise, the six selection sections (41a, 41b, 42a, 42b, 43a, 43b) may be indicated in colors different from each other.

The mode setting function button group 4 includes a manual operation window calling function block 50 and a cooling fan operation mode selection function block 60 in addition to the vehicle type selection window calling function block 40. The equipment on/off changeover function button group 5 has selection functions to control equipments of the test facilities, such as a function of selecting on/off status of the cooling fan, a function of selecting lock/release status of the rollers, and a function of selecting on/off status of auxiliary equipments, a function of selecting on/off status of a dynamometer main power supply, etc.

Next, an operation of the operation display device according to the present invention is explained.

When an operator turns on a power supply of a control terminal PC to thereby indicate the operation window as shown in FIG. 1, a current setting status of a chassis dynamometer is indicated in the status indicating function block 2 of the main menu display area. For instance, in a case where the vehicle type set in a previous test is front-wheel drive and rollers for the front-wheel drive only among rollers of the chassis dynamometer are selected, a brightness of only a front-wheel roller icon among roller icons indicated in the status indicating function block 2 is intensified (as indicated by shading in FIG. 1) so that the front-wheel roller icon is indicated in a display state different from that of a rear-wheel roller icon.

Next, a setting of combination of the rollers to be used in accordance with a change of the vehicle type is carried out by selecting the vehicle type selection window calling function block 40 with a mouse-click or a touch-panel operation. When the vehicle type selection window calling function block 40 is selected, the vehicle type selection window as shown in FIG. 2 appears. In the current setting display section 44 on the left side of the vehicle type selection window at the time at which the vehicle type selection window is called, an equipment construction indicating combination of the rollers as currently set in conformity to the vehicle type is displayed. That is, on a display screen of the current setting display section 44, the same setting status as the current setting status indicated in the status indicating function block 2 is indicated. In this embodiment, front-wheel drive (FWD) as the vehicle type and front rollers (FF) among the rollers as a currently selected status are indicated with a high brightness.

In a case where the above status of the equipment construction is changed to, for example, an equipment construction of fulltime 4WD, the fulltime selection section 43a of the 4WD display section 43 is selected. In response to the selection, a use status of the equipment construction of the fulltime 4WD as a post-change equipment construction is transmitted from the control terminal to the controller. Then, the use status of the post-change equipment construction is confirmed in the controller. After the confirmation, when the control terminal receives an answer from the controller, an arrow mark directed from the current setting display section 44 toward the setting changing display section 45 is indicated as shown in FIG. 3, and the use status of the equipment construction of the fulltime 4WD is indicated on the setting changing display section 45.

Then, it is confirmed whether or not the use status of the equipment construction of the fulltime 4WD indicated in the setting changing display section 45 is erroneous. When the controller answers that no error is indicated in the setting changing display section 45, the equipment construction of the fulltime 4WD is indicated as a currently set equipment construction on the current setting display section 44 as shown in FIG. 4. At the same time, the thus changed equipment construction of the fulltime 4WD is also indicated as a current setting status of the chassis dynamometer in the status indicating function block 2 of the main menu display area. In a similar way, the change of setting of the above-described six types of combination of the rollers in accordance with a change of the respective vehicle types including the front-wheel drive (FWD), the rear-wheel drive (RWD), the four-wheel drive (4WD) and the like, is carried out.

Accordingly, in the operation display device of the present invention, the status indicating function block 2 is disposed in the main menu display area. With this arrangement, the current equipment construction and a speed status upon carrying out a test can be visually recognized. In addition, upon setting combination of the rollers to be used in accordance with a change of the vehicle type, a setting window can be instantaneously indicated only by clicking the vehicle type selection window calling function block 40 in the main menu display area, and the combination can be changed without any error while making visual comparison between the current setting display section 44 and the setting changing display section 45 and confirmation thereof on the same setting window.

Further, upon changing the setting of the combination, the display sections 44, 45 which indicate the setting status before the change and the setting status after the change, respectively, are indicated on the same window, and the roller selection sections 41a, 41b, 42a, 42b, 43a and 43b are located adjacent to each other. Therefore, the change of the setting can be readily carried out to thereby enhance an operability of the operation display device.

In addition, at a time at which the icons of the rollers to be used as indicated in the front/rear roller use/non-use indicator section 21 of the status indicating function block 2 as shown in FIG. 1 are selected, the roller icons selected are indicated with an intensified brightness. Further, it is possible to indicate the roller icons in a rotating state using animation function when the rollers are actually rotated during the test.

Furthermore, with the provision of the mode setting function button group 4 and the equipment on/off changeover function button group 5 in the main menu display area, it is possible to conduct selection, control and confirmation of the rollers for the front and rear wheels of the vehicle at the control terminal located remote from a test cell in which the chassis dynamometer and the auxiliary equipment are installed. Accordingly, an operator can confirm in an operation room without visiting the test cell. As a result, working efficiency and safety of the operator upon the test can be enhanced.

Further, when the cooling fan located forward of the test vehicle is in a use status, the cooling fan is indicated as a pictorial display (for instance, ⇒ etc.) which simulates a flow of wind in the cooling fan use/non-use indicator section 23 of the status indicating function block 2 as shown in FIG. 1. Thus, the use/non-use status of the cooling fan can be visually recognized. In addition, in a case where a change of the use/non-use status of the cooling fan is demanded, cooling fan on/off changeover function of the equipment on/off changeover function button group 5 is selected so that a status of the used equipment in the controller is changed, and at the same time, a brightness of the pictorial display of the cooling fan simulated in the cooling fan use/non-use indicator section 23 is changed (for example, the brightness thereof in the use status is intensified, and the brightness thereof in the non-use status is dimmed).

Further, speed of the test vehicle can be indicated at a numerical value in the speed indicator section 22 of the status indicating function block 2 as shown in FIG. 1.

Accordingly, with the provision of the status indicating function block 2 in the main menu display area, before starting the test, an operator can confirm the status of the rollers to be used corresponding to the current vehicle type. Further, the operator can immediately recognize the speed of the test vehicle and the on/off status of the cooling fan.

Although in this embodiment, the controller and the control terminal are separately explained, the controller per se can be provided with the function of the control terminal.

As explained above, in the operation display device of the present invention, the status indicating function block is disposed in the main menu display area. With this construction, it is possible to confirm whether or not a vehicle type of a test vehicle and combination of rollers to be used upon the test are conformable to each other. Further, it is possible to visually recognize an operating status of equipment such as an on/off status of a cooling fan. Further, when changing the rollers (combination thereof) of the chassis dynamometer which are to be used in accordance with a change of a vehicle type, a setting window can be instantaneously indicated by clicking the vehicle type selection window calling function block of the main menu display area. Simultaneously indicated on the setting window are the setting display section that indicates a current setting status, the display section that indicates the changeover from the current status to an updating status, and the setting display section that indicates a post-change setting status. Therefore, it is possible to change the rollers (combination thereof) while visually comparing and confirming them, thereby preventing an operator of the chassis dynamometer from causing an error in setting. Furthermore, the setting display sections that respectively indicate the setting status before the change and the setting status after the change upon changing the rollers (combination thereof) are indicated on the same window, and the roller selection sections are located adjacent to each other. With this construction, the setting change can be readily carried out, and an operability of the operation display device can be enhanced. In addition, the operator can confirm an operating status of the rollers in a position remote from the test cell. Therefore, it is possible to ensure safety of the operator and a work environment that is free from problems such as noise.

The invention claimed is:

1. A chassis dynamometer system comprising:
a controller configured to control rollers through inverters upon testing a test vehicle loaded on the rollers, and
an operation display device comprising:
an operation window in which setting of the controller is carried out, the operation window comprising a status indicating function block comprising a first icon and a second icon, wherein the first icon indicates a use or a non-use of a front roller and the second icon indicates a use or a non-use of a rear roller as a setting status of the chassis dynamometer system,
wherein the operation window further comprises a main menu display area and a submenu display area, wherein the main menu display area comprises a window that indicates an operation lock function block, a mode setting function button group and an on/off changeover function button group, and the status indicating function block,
wherein the mode setting function button group comprises a vehicle type selection window calling function block that calls a vehicle type selection window displayed in the submenu display area, the vehicle type selection window comprising a vehicle type selection section to select a vehicle type corresponding to the test vehicle and a roller selection section to select the rollers corresponding to the test vehicle, a current setting display section that indicates a current setting status of the rollers, and a setting changing display section that indicates a new setting status of the rollers, and
wherein a user selects the vehicle type and the rollers corresponding to the test vehicle using the vehicle type selection section and the roller selection section, respectively, and the status indicating function block and the setting changing display section are updated, based on the user's selection, to display the new setting status of the rollers.

2. The chassis dynamometer system as claimed in claim 1, wherein the status indicating function block comprises at least one of an indicator section that indicates an on/off status of a cooling fan and a speed indicator section that indicates a vehicle speed of the test vehicle.

3. The chassis dynamometer system as claimed in claim 1, wherein the vehicle type selection window comprises a front-wheel drive display section, a rear-wheel drive display section and a four-wheel drive display section which indicate a front-wheel drive, a rear-wheel drive and a four-wheel drive as drive systems of the test vehicle, respectively, and wherein the front-wheel drive display section comprises a front-wheel drive roller selection section and a front-wheel drive-and-rear-wheel follow-up roller selection section which are disposed adjacent to each other, the rear-wheel drive display section comprises a rear-wheel drive roller selection section and a rear-wheel drive-and-front-wheel follow-up roller selection section which are disposed adjacent to each other, and the four-wheel drive display section comprises a fulltime four-wheel drive roller selection section and a rigid four-wheel drive roller selection section which are disposed adjacent to each other.

* * * * *